Sept. 18, 1934.  L. B. KIMBALL  1,974,071
VALVE FOR THE FRACTIONAL SUPPLY OF FLUIDS
Filed Jan. 28, 1932
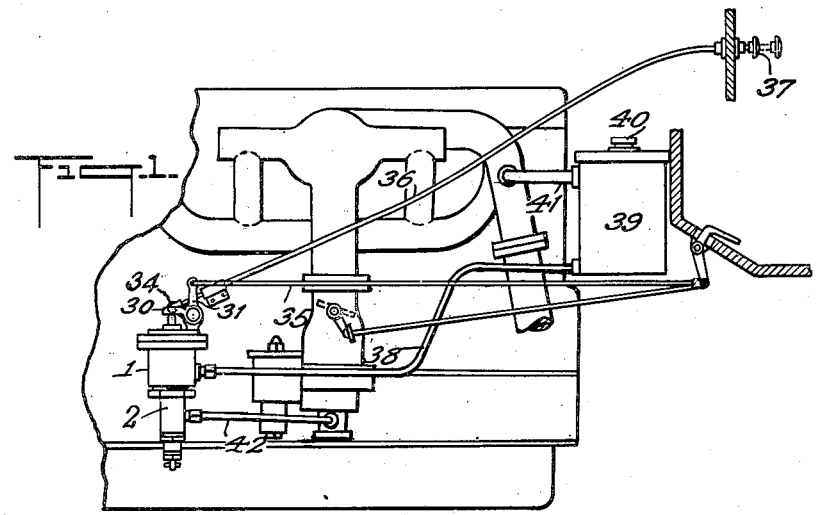
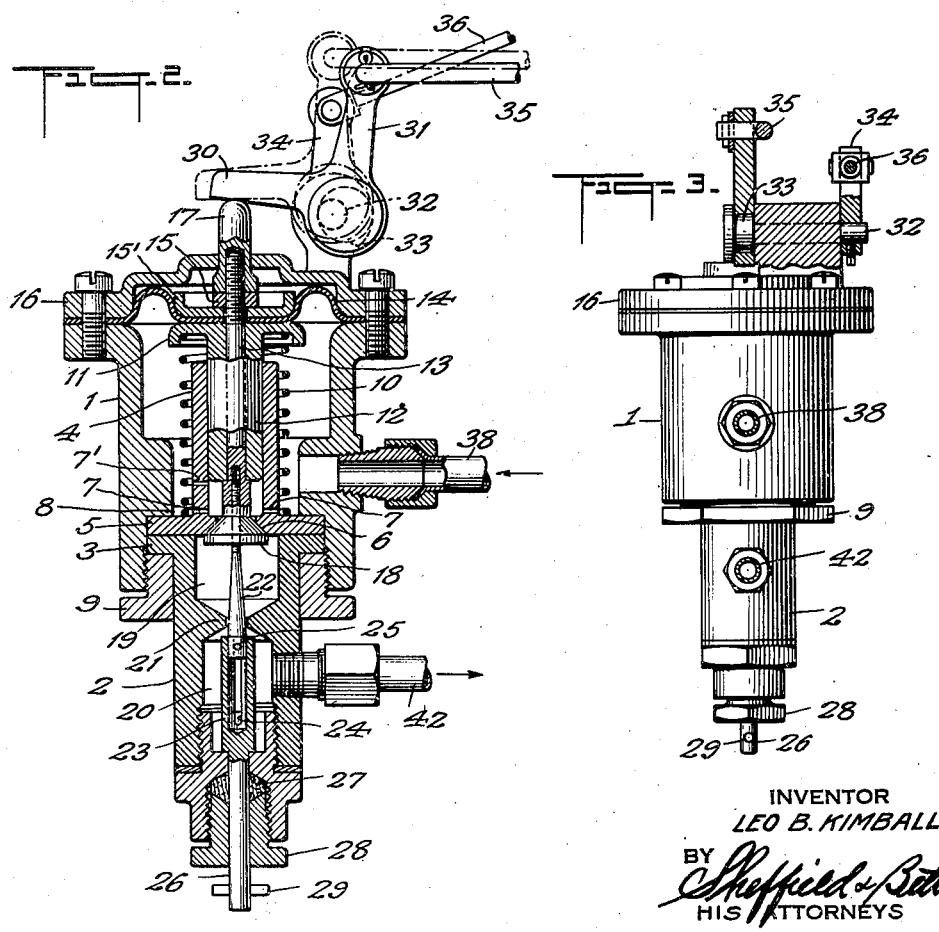
INVENTOR
*LEO B. KIMBALL*
BY
*Sheffield & Betts*
HIS ATTORNEYS

UNITED STATES PATENT OFFICE 1,974,071

VALVE FOR THE FRACTIONAL SUPPLY OF FLUIDS

Leo B. Kimball, New Haven, Conn., assignor to Fuel Development Corporation, a corporation of Delaware Application January 28, 1932, Serial No. 589,430

15 Claims. (Cl. 123—119)

This invention relates to valves that are useful for various purposes where it is necessary to supply some proportionate part of an additional ingredient or fluid to a stream or current of some other fluid which may be used for any desired purpose, such as liquid fuels for internal combustion engines.

My invention is particularly applicable to the supply of fluids to intake conduits or apparatus which control the quantity and condition of fuels used for driving internal combustion automobile engines or engines of similar nature. My invention is also particularly useful for supplying anti-knock fluids to fuels for internal combustion engines for driving aircraft but it may be used to supply other supplementary fluids to internal combustion engines or other devices.

In the operation of internal combustion engines, certain grades of fuel have a tendency to produce a so-called "knock" in the engine at the time of combustion of the charge therein, especially with high compression of the charge, as in modern internal combustion engines. This is particularly the case when the engine cylinders and valves are fouled by deposits of carbon or other collections of substances detrimental to the efficient operation of the engine.

The present applicant has provided an anti-knock liquid to overcome the so-called "knock" in automobile engines, which liquid is described and claimed in his prior Patent No. 1,848,063, issued March 1, 1932. This anti-knock liquid comprises certain mixtures of fluids such as aniline, ethyl alcohol, and butyl alcohol.

It will be appreciated that the knocking produced in an internal combustion engine is usually at a maximum when the greatest power is being demanded of the engine and when the throttle is open to a point approaching its maximum opening such as when an aeroplane or automobile is traveling at high speeds or when the latter is ascending steep grades or hills. Under such conditions it is necessary to supply a larger amount of anti-knock fluid than when the engine is running slowly as on level ground without any considerable demand for the development of power, and when idling. It is, therefore, one object of the present invention to produce a valve which will supply anti-knock or other fluids during the development of maximum power by the engine while at other times it will supply a minimum of anti-knock fluid or no anti-knock fluid at all.

The method for carrying out the above mentioned fractional supply of anti-knock fluids is claimed in my pending application, Serial No. 590,609, filed February 3, 1932.

For a detailed description of one form of valve for carrying out my invention and at present deemed preferable, reference may be had to the following specification and to the accompanying drawing forming a part thereof, in which Figure 1 is a schematic view in elevation of my improved valve as it may be connected with a tank for supplying the desired anti-knock or other fluid.

Fig. 2 is a vertical, sectional view of the valve itself indicating the internal arrangement thereof.

Fig. 3 is an elevational view, showing partly in section, the means for controlling the operation of the valve.

Referring to the drawing, the numeral 1 indicates a substantially cylindrical casing 1, the lower end of which is provided with a detachable and adjustable cylindrical tubular portion 2. The latter portion 2 is provided with a flange 3 at its upper end adapted to enter and be retained within the lower end of the casing 1. In the central portion of the casing 1 there is also a cylindrical, tubular member 4, which terminates at its lower end in a lateral flange 5 and said end is partly closed so as to form a valve seat 6. Small holes 7 are drilled radially through the tubular member 4 just above the flange 5. These holes are preferably made with a small drill such as a No. 60 drill, so that the fluid supplied around the member 4 may flow to the interior thereof. One or more small holes 7' are also drilled through the tubular portion 4 above the holes 7 to allow the escape of air when necessary, as will hereinafter be explained. The flange 5 rests against a projection 8 on the inner surface of the cylindrical casing 1 and the flange 3 contacts with the flange 5. Both of these latter parts are held in position in any suitable way, such as by the use of a screw-threaded gland-like member 9 which when screwed upward to a firm contact with the flange 3, will hold the tubular portions 2 and 4 rigidly in position and yet when the gland 9 is loosened, the tubular portion 2 may be rotated axially to assume any desired angle on its axis. Within the cylindrical casing 1 there is also a helical compression spring 10, the lower end of which rests upon the upper surface of the flange 5 and its upper end is retained within a cap or similar retaining device 11 which is forced upward by said spring 10. Within the tubular member 4 there is a plunger 12, the upper end of which is connected with the cap 11.

A rod 13 passes through the cap 11, the plunger 12 and a flexible diaphragm 14. The rod 13 is maintained in proper position on the cap 11 and the diaphragm 14 in any suitable way such as by the nut 15 and washer 15'. The diaphragm 14 is indicated as being made of some flexible fibrous material such as leather, preferably impregnated with some substance which will cause it to be substantially liquid proof. I appreciate, however, that other forms of diaphragms and diaphragms of other materials may be used and I do not wish to be understood to be limited to any particular material or form thereof. The diaphragm 14 is retained in position by a cover 16 through which a thimble 17 on the rod 13 passes and which closes the upper end of the cylindrical casing 1, being retained in position in any suitable manner such as by screws, as indicated in the drawing. The plunger 12 has projecting from the lower end thereof a valve member 18 which is carried on an enlarged portion of the rod 13. The valve member 18 and the rod 13 are drilled centrally and the hole therein is screw-threaded for a suitable distance, for the purpose hereinafter described. The cylindrical part 2 of the lower portion of the valve is provided with a chamber 19 and a chamber 20. These are separated from each other by an internal flange forming a partition 21, the central opening through which is of such a size as to accommodate a tapering spindle or valve member 22, that is like the tapering portion of a needle valve. This valve member 22 passes through the opening in the partition 21 and upwardly into the valve member 18 and the rod 13, where it is screw-threaded so as to be adjustably retained within said valve member and said rod. The lower end of the tapering valve member 22 enters a tube 23 having longitudinal slots 24 in its walls. These slots retain a transverse pin 25 which passes through the lower end of the valve member 22. The tube 23 is carried on an upper end of a rod 26 which passes through a stuffing box 27 and gland 28. The lower end of the rod 26 is provided with a transverse pin 29 by which said rod may be manually rotated.

It will now be appreciated that when said rod 26 is rotated in either direction it will rotate the tube 23 and the valve member 22. This will cause the upper end of said valve member to enter further or be withdrawn more from the hole in the valve member 18. This provides a means for adjusting the valve member 22 so that the opening between said valve member and the hole in the partition 21 may be controlled to suit various conditions demanding variations in the supply of the anti-knock fluid or other liquid being used. The thimble 17, the rod 13, the plunger 12, the valve member 18 and the valve member 22 being all connected together, they may be caused to move vertically to any desired extent by any suitable means for so doing. In Figs. 2 and 3 I have illustrated one manner of controlling said parts.

This is a bell-crank lever having an arm 30 and an arm 31 the junction of which is mounted upon a suitable axle 32, provided at one end with an eccentric 33. The eccentric 33 serves to adjust the position of the axis of the bell crank lever 30—31 by placing it in a higher or lower position relative to the thimble 17, depending upon the angle at which the eccentric is placed. The eccentric 33 is controlled through the shaft 32 by a lever 34 adjustably mounted thereon. The oscillation of this lever obviously raises or lowers the bell-crank lever since it determines the angular relation between the bell crank lever and the said eccentric. The arm 31 is connected with any suitable controlling device such as the throttle lever or accelerator member of an aeroplane or automobile by a rod or suitable connection 35. The arm 34 which controls the eccentric is also connected through a rod or wire 36 or other suitable connection with a knob or similar terminal member 37, which may be situated on the instrument board or in any other convenient position.

The cylindrical casing 1 is provided with an inlet pipe for the fluid used, as indicated at 38. This inlet pipe is connected with a suitable supply of the fluid such as the tank or reservoir 39 which is provided with the usual filling cap 40 and preferably with a pipe for producing pressure upon the surface of the fluid therein as indicated at 41. This pipe may extend to any suitable point such as to the exhaust pipe of the engine if greater or variable pressure is required on the liquid other than is produced by the force of gravity.

The lower tubular portion 2 of the valve casing is provided with an outlet pipe 42 which may extend to any point where the fluid controlled by the valve is used. When the valve is used in connection with the supply of anti-knock fluid to fuel conduits of an internal combustion engine, it should enter said conduit at a point where the fluid will be immediately mixed with the fuel. Such a point is preferably a point adjacent the carbureter just before the fuel is vaporized or atomized for passage through the intake and throttle valve of the engine, as will be appreciated by one skilled in the art.

The operation of my improved valve may be described as follows when used in connection with the supply of an anti-knock fluid to fuel provided for driving an internal combustion engine. Assuming in the first place that the engine is idling and not supplying any power except to drive the engine, the parts will be in position substantially indicated in Fig. 2. That is, the valve member 18 will rest against its valve seat 6 and the opening in the partition 21 will be reduced to its minimum size since the valve member 22 is in its highest position. These conditions will be produced by reason of the fact that the spring 10 forces the cap 11 and the rod 13 upward to the limit of its movement without opposition. Since the pipe 38 is connected with the reservoir or tank 39, the space between the member 4 and the cylindrical casing 1 will be partly filled with fluid. Fluid will also flow through the small holes 7 into the space immediately above the valve member 18 so that said space will be substantially full of said fluid, air being allowed to escape through the hole 7'. Under normal conditions the spaces below the valve member 18 including the chambers 19 and 20 are filled. The pipe 42 will also be substantially filled with the fluid owing to previous operations of the valve.

Now, assuming that the clutch of the automobile transmission mechanism is put into operation and the throttle is opened or the accelerator is depressed, considerable pressure will be produced in the exhaust manifold of the engine. During the change in the position of the throttle or the depression of the accelerator, the motion thereof will also force the rod 35 toward the left. This will depress the arm 30 of the bell crank lever and consequently depress the rod 13 against the pressure of the spring 10. Said rod 13 being depressed, will move the valve member 18 downward and also the valve member 22.

As an incident to these motions, the plunger 12 will be depressed and since the anti-knock fluid has filled the space below said plunger, a depression of said plunger and a lowering of the valve member 18 will force the fluid out of said space below said plunger into the chamber 19. It will also be forced through the opening in the partition 21 and past the valve member 22. Since the fluid in the chamber 20 is free to flow out through the pipe 42 to the fuel supply conduit or carbureter, the anti-knock fluid will immediately be forced into the stream of fuel being supplied to the engine. This will take place in varying degrees according to the opening of the throttle or the depression of the accelerator itself.

It will be apparent that when the engine is running at the highest speed or when the largest power is being demanded thereof, the pressure in the exhaust manifold will be comparatively high and therefore the pressure on the surface of the fluid in the tank 39 will be correspondingly high. This will continue to force the anti-knock fluid through the pipe 38 into the chambers 19 and 20 and into the pipe 42 so long as the larger demand is made upon the engine, resulting from increased speed or increased power.

It will thus be appreciated that I have provided a valve which will not only supply a large amount of anti-knock or similar fluid to the fuel system at the times when poor grades of fuel are used or when the engine has become fouled and particularly when a heavy power demand is made upon the engine, and I have provided means whereby the motion of the throttle controlling lever or the accelerator will positively and initially force a supply of the anti-knock fluid into the pipe leading to the fuel system.

It will also be apparent that I have provided means which allow easy adjustment of the parts and make the valve applicable to engines of large capacity or of relatively small capacity. To that end the flow past the valve member 22 is determined by the position of the said valve member relative to the valve member 18. When the rod 26 is turned counter clock-wise sufficiently to withdraw the valve member 22 downward slightly away from the valve member 18, the space around the valve member 22 will then normally be somewhat larger in area. Conversely, when the rod 26 is turned in the opposite direction to raise the valve member 22, the space around the valve member 22 will be reduced in area.

It will also be appreciated that for low speeds and comparatively small power demands, the parts may be adjusted so that the valves will not be opened until it be desired to supply anti-knock or other fluid to the engine. This may be accomplished by having the eccentric 33 and the lever arm 30 in a higher position, as shown in dotted lines, so that the arm 30 does not contact with the thimble 17 until the throttle has been opened to a sufficient extent to cause the engine to run at a higher speed than would normally be required. In other words, the supply of the anti-knock or other fluid need not be caused to enter the fuel stream or supply until more than normal or comparatively low power or speed is required.

If it be necessary to supply a larger amount of fluid to the engine at all times including the supply of fluid at low speeds the knob 37 may be pulled out by the operator which will lower the position of the eccentric 33 so that the arm 30 will come into contact with the thimble 17 and depress the same practically simultaneously with the depression of the accelerator or an opening of the throttle.

Thus adjustment may be had to cause the supplementary fluid to be supplied at any desired depression of the accelerator or any desired opening of the throttle.

Having described this embodiment of my invention, what I claim and desire to protect by Letters Patent is:

1. A valve for controlling the supply of varying amounts of a supplementary liquid to a main stream of fuel, in a power driven device, comprising a casing, a valve member therein for closing the passage between the fuel intake and the outlet of said valve, a spring for maintaining said valve member normally in closed position, means for manually displacing said valve member by the operator, and means for producing a gaseous pressure on said liquid for causing an increased flow thereof through the valve in proportion to the varying power produced by said main fuel in the apparatus with which the valve is connected.

2. A valve for adding varying amounts of a supplementary liquid to a main stream of fuel entering a power generating device in which said main stream of fuel is utilized, comprising a casing, a movable valve member therein for controlling the passage of said supplementary liquid, a spring for holding said valve member normally in closed position, an external part for operating said valve member, a supply reservoir for said supplementary liquid, connected with said valve, and means for producing a gaseous pressure above atmospheric pressure on the surface of the liquid in said reservoir in proportion to the amount of power generated by said power device.

3. A valve for adding varying amounts of a supplementary liquid to a main stream of fuel entering a device that utilizes said fuel, comprising a casing, a movable valve member therein, a tapering valve spindle therein, a spring for holding said valve members normally in closed position, an external connection for operating said valve members and means for forcing said supplementary liquid through said valve by producing gaseous pressures above atmospheric pressure on said supplementary liquid.

4. A valve for adding varying amounts of a supplementary liquid to a main stream of fuel entering a power generating device in which said main stream of fuel is utilized, comprising a casing, a movable valve member therein for controlling the passage of said supplementary liquid, said casing having a chamber below said valve member, a tapering valve spindle in the outlet of said chamber, a spring for holding said valve members normally in closed or partly closed positions, an external connection for operating said valve members, a supply reservoir for said supplementary liquid, connected with said valve, and means for producing a pressure above atmospheric pressure on the surface of the liquid in said reservoir in proportion to the amount of power generated by said power device.

5. A valve for adding varying amounts of a supplementary liquid to a main stream of fuel entering a power driven device, comprising a casing, a valve member therein for closing the passage between the inlet and the outlet of said valve, a plunger connected with said valve member above the same, a spring for retaining said valve member closed and said plunger normally in raised position, external means for displacing said valve member by the operator and producing a downward motion of said plunger, and means for supplying said supplementary liquid and for producing a pressure on said liquid above atmospheric pressure, for causing an increased flow thereof through the valve in proportion to the varying power produced by said main fuel in the apparatus with which the valve is connected.

6. A valve for controlling the supply of varying amounts of a supplementary liquid to a main stream of fuel entering a power driven device, comprising a casing, a valve member therein for closing the passage between the intake and the outlet of said valve, a spring for retaining said valve member normally in closed position, external means for displacing said valve member by the operator of said device, said casing having a chamber below said valve member, a supply pipe for conducting said supplementary liquid to a point above said valve at a pressure above atmospheric pressure, a tapering spindle in the outlet of said chamber and means for adjusting the position of said spindle within said outlet relative to said valve member.

7. A valve for adding varying amounts of a supplementary liquid to a main stream of fuel, comprising a casing, a valve member therein for closing the passage between the inlet and the outlet of said valve, a spring for retaining said valve member normally in closed position, an external member by which said valve is displaced, said casing having a chamber below said valve member, a supply pipe for conducting said supplementary liquid to a point above said valve at a pressure above atmospheric pressure, a tapering spindle in the outlet of said chamber, the upper end of said spindle having screw threads which engage screw threads in said valve member, and means extending outside of said casing for turning said spindle to adjust the position of the same in said outlet.

8. A valve for controlling the supply of varying amounts of a supplementary liquid to a main stream of fluid entering a power operated device, comprising a casing, a valve member therein for closing the passage between the intake and outlet of said valve, a spring for maintaining said valve member normally in closed position, means for manually displacing said valve member by the operator, an adjustable device in said displacing means for determining the initial point at which said displacing means will act on said valve member, and means for causing an increased flow of said liquid through said valve in proportion to the varying power developed by the device with which said valve is connected.

9. A valve for controlling the supply of varying amounts of a supplementary liquid to a stream of fuel entering a power operated device, comprising a casing, a valve member therein for closing the passage between the intake and outlet of said valve, a spring for maintaining said valve member normally in closed position, means for manually displacing said valve member by the operator, an adjustable oscillatory member pivoted in respect to said casing for raising and lowering the contact member of said displacing means for determining the initial point at which said displacing means will act on said valve member, and means for causing an increased flow of said liquid through said valve in proportion to the varying power developed by the device with which said valve is connected.

10. In combination with an internal combustion engine or similar device, having a suction operated intake and an outlet passage for exhaust gases, a casing located adjacent thereto, a valve member therein for closing the passage between the intake and the outlet of said valve, a spring for maintaining said valve normally in closed position, means for manually displacing said valve member by the operator of said engine, a reservoir adapted to contain a supplementary liquid which is supplied to said valve, and a connection between the outlet passage of said engine and said reservoir for producing a gaseous pressure on said liquid to cause an increased flow thereof through said valve in proportion to the varying power developed by said engine.

11. In combination with an internal combustion engine or similar device, having a suction operated intake and an outlet passage for exhaust gases, a casing located adjacent thereto, a valve member therein for closing the passage between the intake and the outlet of said valve, a tapering spindle therein forming a secondary valve member, a spring for holding said valve members closed or partially closed, an external connection for displacing said valve members by the operator of said engine, a reservoir adapted to contain a supplementary liquid which is supplied to said valve, and a connection between the outlet passage of said engine and said reservoir for producing a gaseous pressure on said fluid to cause an increased flow thereof through said valve in proportion to the varying power developed by said engine.

12. In combination with an internal combustion engine or similar device, having a suction operated intake and an outlet passage for exhaust gases, a casing located adjacent thereto, a valve member therein for closing the passage between the intake and the outlet of said valve, said casing having a chamber below said valve member and provided with an outlet opening, a tapering spindle in said outlet opening, a spring for holding said valve members normally in closed or partially closed positions, an external connection for actuating said valve members by the operator of said engine, a supply reservoir for a supplementary fluid which is supplied to said valve and connected therewith and a connection between the outlet passage of said engine and said reservoir for producing a gaseous pressure on said fluid to cause an increased flow thereof through said valve in proportion to the varying power developed by said engine.

13. In combination with an internal combustion engine or similar device, having a suction operated intake and an outlet passage for exhaust gases, a casing located adjacent thereto, a valve member therein for closing the passage between the fluid intake and the outlet of said valve, said casing having a chamber below said valve member and provided with an outlet opening, a tapering spindle in said outlet opening, a spring for holding said valve members normally in closed or partially closed positions, an external connection with the throttle controlling mechanism of said engine that is actuated by the operator of said engine, a supply reservoir for a supplementary fluid which is supplied to said valve and connected therewith, and a connection between the outlet passage of said engine and said reservoir for producing a gaseous pressure on said fluid to cause an increased flow thereof through said valve in proportion to the varying power developed by said engine.

14. In combination with an internal combustion engine or similar device, having a suction operated intake and an outlet passage for exhaust gases, a casing located adjacent thereto, a valve member therein for closing the passage between the intake and the outlet of said valve, a spring for maintaining said valve normally in closed position, means for manually displacing said valve member by the operator of said engine, an adjustable device in said displacing means for determining the initial point at which said displacing means will act on said valve member, a reservoir adapted to contain a supplementary liquid which is supplied to said valve, and a connection between the outlet passage of said engine and said reservoir for producing a gaseous pressure on said liquid to cause an increased flow thereof through said valve in proportion to the varying power developed by said engine.

15. In combination with an internal combustion engine or similar device, having a suction operated intake and an outlet passage for exhaust gases, a casing located adjacent thereto, a valve member therein for closing the passage between the intake and the outlet of said valve, a spring for maintaining said valve normally in closed position, an external connection between said valve member and the throttle controlling mechanism of said engine that is actuated by the operator of said engine, an adjustable eccentric pivoted on said casing for raising and lowering the contact member of said external connection, for determining the initial point at which said connection will act on said valve member, a reservoir adapted to contain a supplementary liquid which is supplied to said valve, and a connection between the outlet passage of said engine and said reservoir for producing a gaseous pressure on said liquid to cause an increased flow thereof through said valve in proportion to the varying power developed by said engine.

LEO B. KIMBALL.